(No Model.)
C. MONJEAU.
SAND SCREEN OR FILTER.
No. 463,759.                    Patented Nov. 24, 1891.
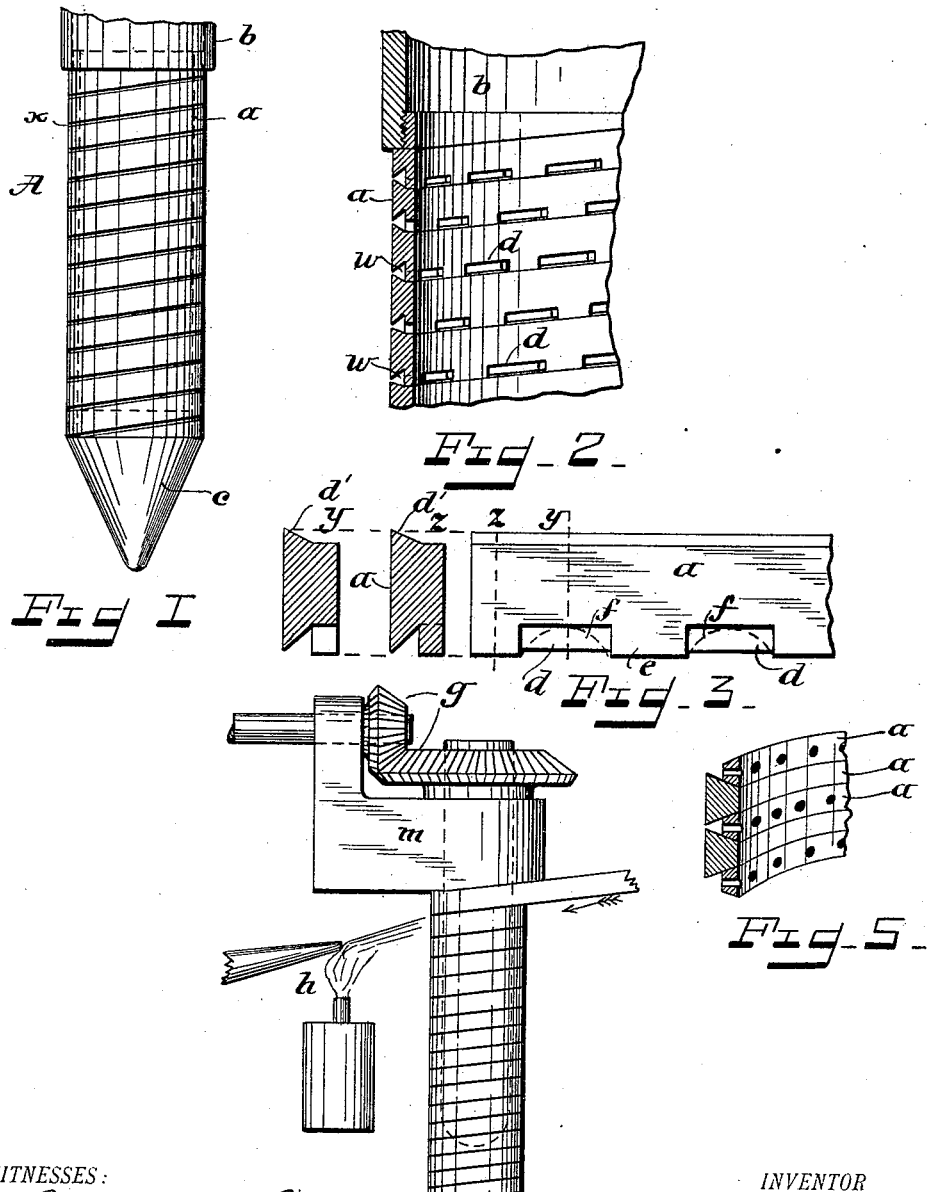
WITNESSES:
John A. Lynch
E. Hosea
INVENTOR
Cleophas Monjeau
BY
R. M. Hosea
ATTORNEY

UNITED STATES PATENT OFFICE.

CLEOPHAS MONJEAU, OF MIDDLETOWN, OHIO.

SAND SCREEN OR FILTER.

SPECIFICATION forming part of Letters Patent No. 463,759, dated November 24, 1891.

Application filed January 19, 1891. Serial No. 378,253. (No model.)

*To all whom it may concern:*

Be it known that I, CLEOPHAS MONJEAU, a citizen of the United States, residing at Middletown, in the county of Butler and State of Ohio, have invented new and useful Improvements in Sand Screens or Filters, of which the following is a specification.

My invention relates to strainers or "sand-screens" intended to be used on the submerged terminals of pump-mains, particularly those of tube-wells, &c., and is in the nature of an improvement on Patent No. 436,502, granted to me on September 16, 1890. In said patent I described a sand-screen consisting, essentially, of a ribbed or perforated core having wound spirally thereon a flat band of metal provided with lugs or projections at one or both edges by which the contiguous windings of the band were held apart to form a spiral screening-slit interrupted only by the said lugs.

My present improvement consists, first, in a sand-screen composed of a strip or strips wound spirally, wherein there is presented an exterior inwardly-widening screening-slit continuous and uninterruped, and, second, in a screen composed of a strip or strips wound spirally, wherein the separate supporting-core is dispensed with and the contiguous edges or shoulders of the spiral strips are united by solder or welding to form a cylinder.

Mechanism embodying my invention is illustrated in the accompanying drawings, in which—

Figure 1 is a side elevation of a screen complete; Fig. 2, a partial axial section exhibiting the construction; Fig. 3, a rear view and cross-section of the band in the planes indicated at $y\ z$ of the figure; Fig. 4, a detail exhibiting the mandrel and the strip being fed thereto and wound thereon; Fig. 5, a detail cross-section showing a modified construction.

Referring now to the drawings, A designates the complete screen, consisting of a cylindrical tube composed of a flat band $a$, wound in spiral increments, a cap $b$, and point $c$. The band is preferably formed, as shown in Fig. 3, with beveled front edges $d\ d'$, extending its front face, and a shoulder $e$, extending its rear face at one side. The shoulder $e$ extends a minute distance beyond the line of the front beveled edge $d$ and is recessed at intervals, as at $f$, leaving the intervening portions as spacing-lugs. The band is wound in spiral increments, as shown in Fig. 4, upon a short mandrel $m$, (shown in dotted lines,) driven by gears $g$ or other suitable mechanism, thus bringing the opposite edges of the band together, as shown in Fig. 2. These edges are united by soldering or brazing—as, for example, the contact surfaces being previously "tinned" by the solder, are caused to unite in the act of being thus brought together by heat furnished by the blow-pipe flame $h$; or preferably the edges are united by the process of electric welding by means well known and which therefore need not be here described. There is thus formed a continuous tube fed off the lower end of the mandrel $m$, which is subsequently cut to proper length and then fitted with the caps $b$ and driving points $c$ to constitute the screening terminals A, the cylindrical form and homogeneous structure giving ample resisting strength without requiring an internal core.

The method of manufacture is as well applicable to a band of other cross-sectional forms as to that here shown. The special advantage in this regard in that shown is in the production of a continuous and uninterrupted spiral slit or screening-aperture $x$, widening inwardly and forming a continuous water-way $w$, communicating with the interior by the recessed apertures $d$. The width of the screening apertures or slit $x$ may be regulated as desired.

The modification exhibited in Fig. 5 merely substitutes for the shoulder $e$ of the strip $a$, as described, an extra strip $a'$, formed to fit between and space apart the contiguous edges of the screening-strip $a$. The auxiliary strip may be perforated or recessed at its sides to form the apertures $d$ communicating with the interior. The effect when parts are together and united is the same as already described, the modification being constructive merely, to facilitate and cheapen the manufacture, as two strips may be as readily fed to the mandrel, bent, and united, as one.

I claim as my invention and desire to secure by Letters Patent of the United States—

1. A sand-screen for well-tubes, consisting of a cylindrical tube formed of a continuous strip or strips of metal wound in successive spiral increments, presenting a continuous exterior screening-slit widening inwardly and communicating through the interior supports with the interior of the tube thus formed, substantially as set forth.

2. A sand-screen for well-tubes, consisting of a cylindrical tube formed of a continuous strip or strips of metal wound in successive spiral increments with their flat abutting edges or shoulders united by soldering or welding, leaving a continuous external spiral screening-slit communicating with the interior through the united portion constituting the support, substantially as set forth.

3. A sand-screen of the character described, composed of a strip with a beveled outer edge and wound spirally, having its contiguous edges spaced apart by an intervening perforated shoulder or strip of lesser height and width and united at the contact edges, whereby there is formed a continuous outer screening-slit with a continuous inwardly-widening water-way communicating with the interior by apertures in the inner wall of said water-way, substantially as set forth.

In testimony whereof I have hereunto set my hand in the presence of two subscribing witnesses.

CLEOPHAS MONJEAU.

Witnesses:
　L. M. HOSEA,
　E. HOSEA.